(No Model.)

E. O. McGLAUFLIN.
CABLE RAILWAY.

No. 347,624. Patented Aug. 17, 1886.

Witnesses
R. H. Sanford.
R. R. Paul

Inventor
Eugene O. McGlauflin

N. PETERS, Photo-Lithographer, Washington, D. C.

UNITED STATES PATENT OFFICE.

EUGENE O. McGLAUFLIN, OF MINNEAPOLIS, MINNESOTA, ASSIGNOR OF ONE-HALF TO WILLIAM McCRORY, OF SAME PLACE.

CABLE RAILWAY.

SPECIFICATION forming part of Letters Patent No. 347,624, dated August 17, 1886.

Application filed December 2, 1885. Serial No. 184,434. (No model.)

*To all whom it may concern:*

Be it known that I, EUGENE O. McGLAUFLIN, a citizen of the United States, and a resident of Minneapolis, in the county of Hennepin and State of Minnesota, have invented certain Improvements in Cable Railways, of which the following is a specification.

This invention relates to improvements in means for supporting and guiding the cables of cable roads; and the invention consists, generally, in oppositely-arranged cable-supporting sheaves having grooves to receive and guide the cable.

The invention further consists in a cable road having a conduit with slots through its walls and cable-supporting sheaves that are located outside the conduit, and project through the slots into the interior of the conduit and support and guide the cable.

Figure 1:
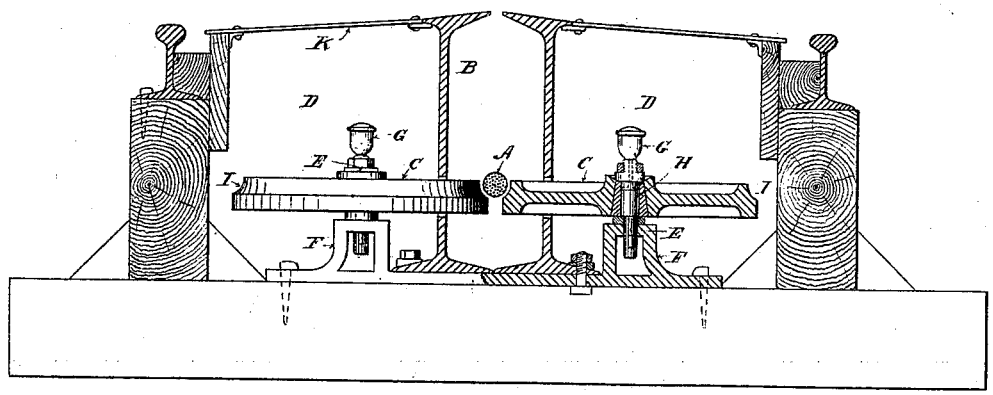
Figure 2:
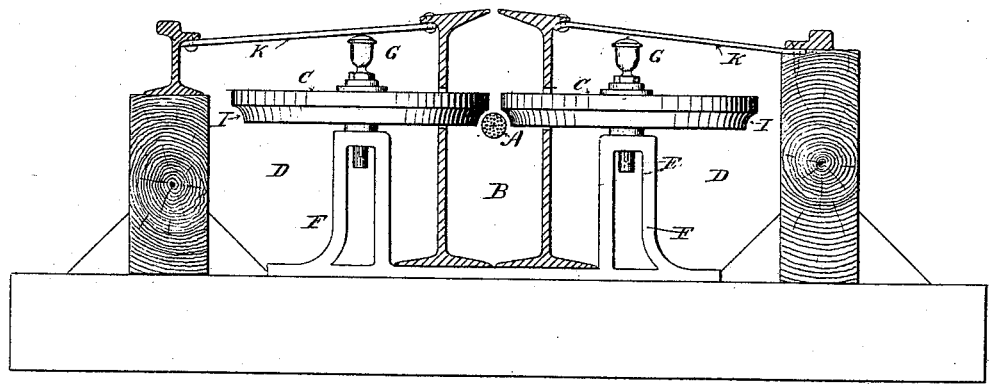

In the accompanying drawings, forming part of this specification, Figure 1 is a transverse vertical section of a cable road embodying my invention. Fig. 2 is a similar view showing a different arrangement of the sheaves for a special purpose.

A in the drawings represents the cable of a cable road, and B represents the tube or conduit in which the cable travels. This conduit or tube is preferably of small size, and, as here shown, is formed of I-beams or channel-irons, which are placed side by side, with a narrow opening between the upper flanges. Any other suitable tube or conduit may be used instead of that here shown, though I prefer this construction. The walls of the tube are slotted or formed with openings at suitable intervals, and outside of these slotted walls are suitable chambers, D, within which are mounted the sheaves C, that project into the tube through the slots in the walls. These sheaves are preferably mounted on vertical axes E, so that they turn in horizontal planes, and they are arranged in pairs upon opposite sides of the tube. The axes of the sheaves are supported in suitable chairs, F, which are spiked or otherwise secured to timbers in the chamber, and the plates of these chambers may also extend under and be secured to the beams forming the conduit. In Fig. 1 I have shown the chairs secured to the conduit by bolts and nuts. The sheaves are provided upon their edges with grooves I. These grooves are in the upper part of the edges of the sheaves and extend to their horizontal faces, and are preferably substantially quarter-circles in cross-section, so that a substantially semicircular groove is formed between the contiguous edges of the sheaves, that receives and supports the cable or rope A. This groove is open upon its top, so that the cable is free to rise from the sheaves as the grip passes over them. The sheaves are preferably formed with a central conical opening, into which a conical sleeve fits. The sheaves are thereby formed in sections, so that the wearing parts may be replaced at small expense. I also supply suitable lubricators, G, for the sheaves. With this construction I am able to use a conduit of small size and sheaves of large diameter.

Heretofore, where the sheaves have been mounted in the conduit, it has been necessary to use a large conduit and small sheaves. Such a conduit is necessarily more expensive and the means for mounting the sheaves more complicated. The small sheaves must rotate very rapidly, which causes a great deal of heat from friction, and it is also difficult to get at the sheaves to oil them. These objections are all obviated by my invention. The chambers, preferably, extend from the conduit to the timbers upon which the rails are laid, and each sheave is in diameter preferably equal to about one-half the diameter of the track, though I do not confine myself to any particular dimensions. These large sheaves rotate at a slow rate of speed, and but little heat is generated.

The chambers are supplied with suitable covers, K, through which the sheaves are easily accessible for oiling or repairing. The conduit may be much smaller than those usually employed, and hence less expensive.

The sheaves may be made of metal or metal and wood, as preferred. Any form of chair or frame may be used that will hold the sheaves in proper position.

In Fig. 2 I have shown the sheaves reversed for use at the bottom of an incline where it is necessary to hold the cable down. The edges of the sheaves are far enough apart to permit the shank of the grip to pass between them.

I prefer the horizontal arrangement of sheaves, as I believe this to be the most convenient, but do not limit myself thereto, as the sheave might be inclined and still give good results.

Where a large conduit is used the sheaves may be located within it; but I prefer to locate them in the independent chambers and have them project into the conduit.

I claim as my invention—

1. In a cable road, a tube or conduit having slots or openings in its opposite walls, in combination with cable-supporting sheaves projecting into said conduit through the openings in its walls, and having cable-receiving grooves extending to the upper faces of the sheaves, for the purpose set forth.

2. The combination, with a cable tube or conduit having openings in its opposite walls, of horizontal cable-supporting sheaves projecting into said conduit through said openings, and having cable-receiving grooves extending to the horizontal faces of the sheaves, substantially as described.

3. The combination, with the conduit having openings in its opposite walls, of the chambers D and the horizontal sheaves C, having grooves I extending to the horizontal faces of the sheaves, mounted in said chambers, and projecting into said conduit from opposite sides through the openings in its walls, substantially as described.

4. In a cable road, the combination, with the cable, of the opposite sheaves C, having the cable-receiving grooves I extending to the faces of the sheaves, all substantially as and for the purpose set forth.

5. In a cable road, the combination, with the cable, of the horizontal sheaves C, having the cable-receiving grooves I extending to the horizontal faces of the sheaves, all substantially as and for the purpose set forth.

In testimony whereof I have hereunto set my hand this 27th day of November, 1885.

EUGENE O. McGLAUFLIN.

In presence of—
A. C. PAUL,
R. H. SANFORD.